United States Patent
Oshiro

(10) Patent No.: US 7,411,482 B2
(45) Date of Patent: Aug. 12, 2008

(54) WIRELESS TAG READER AND WRITER

(75) Inventor: Toshiaki Oshiro, Izu (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 173 days.

(21) Appl. No.: 11/362,888

(22) Filed: Feb. 27, 2006

(65) Prior Publication Data

US 2006/0214803 A1 Sep. 28, 2006

(30) Foreign Application Priority Data

Mar. 28, 2005 (JP) .............................. 2005-091393

(51) Int. Cl.
*H04Q 5/22* (2006.01)
(52) U.S. Cl. ................. 340/10.51; 340/572.7
(58) Field of Classification Search ................ 340/10.1, 340/10.51, 572.1, 572.7; 235/435, 439
See application file for complete search history.

(56) References Cited

U.S. PATENT DOCUMENTS 6,679,428 B2 * 1/2004 Miura et al. ................ 235/435

2002/0196126 A1 * 12/2002 Eisenberg et al. .......... 340/10.2
2006/0214797 A1 * 9/2006 Mori et al. ................ 340/572.1

FOREIGN PATENT DOCUMENTS

JP 2002337827 A * 11/2002
JP 2004-43049 2/2004

* cited by examiner

*Primary Examiner*—Thomas J Mullen, Jr.
(74) *Attorney, Agent, or Firm*—Pearne & Gordon LLP

(57) ABSTRACT

A wireless tag reader and writer includes: a plurality of read and write boxes each having an opening at one end, through which an article with a wireless tag is accommodated, and a read antenna and a write antenna on parts of the side wall at the end opposite to the opening; and a box storage having a plurality of storage compartments for storing the read and write boxes. Each of the read and write boxes is fixed in the storage compartment with a fixing screw fixed to the side wall of the read and write box adjacent to the opening in such a manner the fixing screw is fixed in an inclined slide slit in the outer wall of the box storage adjacent to the opening such that the opening is higher than the opposite end. Thus, the wireless tag can be located close to the reading antenna and the write antenna.

4 Claims, 4 Drawing Sheets

(A)

(B)

WIRELESS TAG READER AND WRITER

CROSS-REFERENCE TO RELATED APPLICATION

This application is based upon and claims the benefit of priority from prior Japanese Patent Application No. 2005-091393, filed on Mar. 28, 2005, the entire contents of which are incorporated herein by reference.

BACKGROUND OF THE INVENTION

1. Field of the Invention

The present invention relates to wireless tag readers and writers for reading information from wireless tags stuck to articles and for writing information to the wireless tags.

2. Description of the Related Art

As shown in FIG. 1, a wireless tag reader and writer 1 of this type is generally divided into multiple wireless-tag-read-and-write-storage compartments 2. The wireless-tag-read-and-write-storage compartments 2 have accommodated read and write boxes 5, as shown in FIG. 2 and to be specifically described later, for storing articles each having a wireless tag 3 at the end; e.g., mail 4. Since the wireless-tag-read-and-write-storage compartments 2 have a horizontal bottom, as described in Japanese Patent Publication No.2004-43049, the read and write boxes 5 have also been stored in each wireless-tag-read-and-write-storage compartments 2, with the bottom held in a horizontal state.

As shown in FIG. 2, when the conventional wireless tag reader and writer 1 stores multiple pieces of mail 4 each having a wireless tag 3 into the read and write box 5, parts of the mails with the wireless tag stacked thereon are overlapped and therefore the mail 4 is tilted because of the thickness of the stacked wireless tags 3 or the thickness of the contents of the mail 4. This poses the problem that the mail 4 slides toward this side, or toward an opening 6 through which the mail 4 is inserted, to come out of the normal readable and writable area 9 (hereinafter, referred to as a normal reaction area 9) of a read antenna 7 and a write antenna 8 fixed to part of the side wall, thus making it impossible to read positional information from the wireless tags 3 and to write management information to the wireless tags 3.

FIG. 2 illustrates the problem simply. In the drawing, upper two pieces of the mail 4 slide toward the opening 6 because of the thickness of the wireless tags 3 of the mail 4, to bring the wireless tags 3 out of the normal reaction area 9 of the read antenna 7 and the write antenna 8.

BRIEF SUMMARY OF THE INVENTION

Accordingly, an advantage of the present invention is to provide a wireless tag reader and writer in which the wireless tags of mail are always located in the normal reaction area of a read antenna and a write antenna in a read and write box for storing articles such as mail.

To achieve the above advantage, one aspect of the present invention is to provide a wireless tag reader and writer storing read and write boxes in its storage compartments. A read antenna and a write antenna are provided on part of a side wall of each read and write box. And the read and write boxes each having a front opening, through which an article with a wireless tag is accommodated. The read and write boxes each have a fixing-screw fixing portion on the side wall adjacent to the front opening, for fixing a fixing screw; and an insertion hole in the side wall at rear end opposite to the front opening, for allowing a long rotation shaft to pass through. The storage compartments each have an inclined slide slit in its outer side wall adjacent to a compartment opening, through which the fixing screw fixing portion slides; and an insertion hole for allowing the long rotation shaft to pass through. The read and write boxes each are mounted in the storage compartments of the wireless tag reader and writer so as to rotate around the rotation shaft in the storage compartments.

With the wireless tag reader and writer according to an embodiment of the invention, the inclination of the read and write boxes each can be controlled freely. This configuration prevents articles from sliding toward the front opening of the read and write box irrespective of the thickness of the contents of the articles and the wireless tags, and the amount of articles stacked. Accordingly, in the read and write boxes the wireless tags stuck to the articles can always be held in the normal write area of the read and write antennas, allowing accurate reading of positional information from the wireless tags and the writing of management information to the wireless tags.

DETAILED DESCRIPTION OF THE INVENTION

A wireless tag reader and writer according to an embodiment of the invention will be described hereinbelow with reference to the drawings. While the embodiment is described for the case in which an article with a wireless tag is mail such as an envelope, the invention is not limited to that, but may be applied to any other articles, particularly, sheet-like articles.

Figure 1:
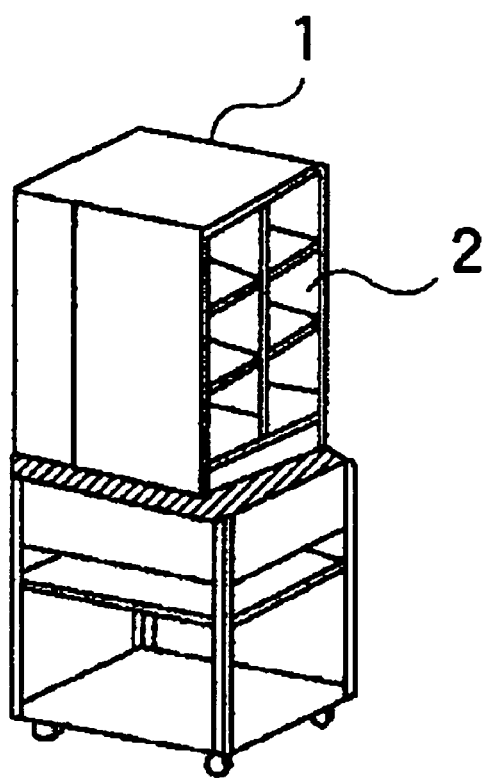
FIG. 1 is a perspective view of a conventional wireless tag reader and writer.
Figure 2:
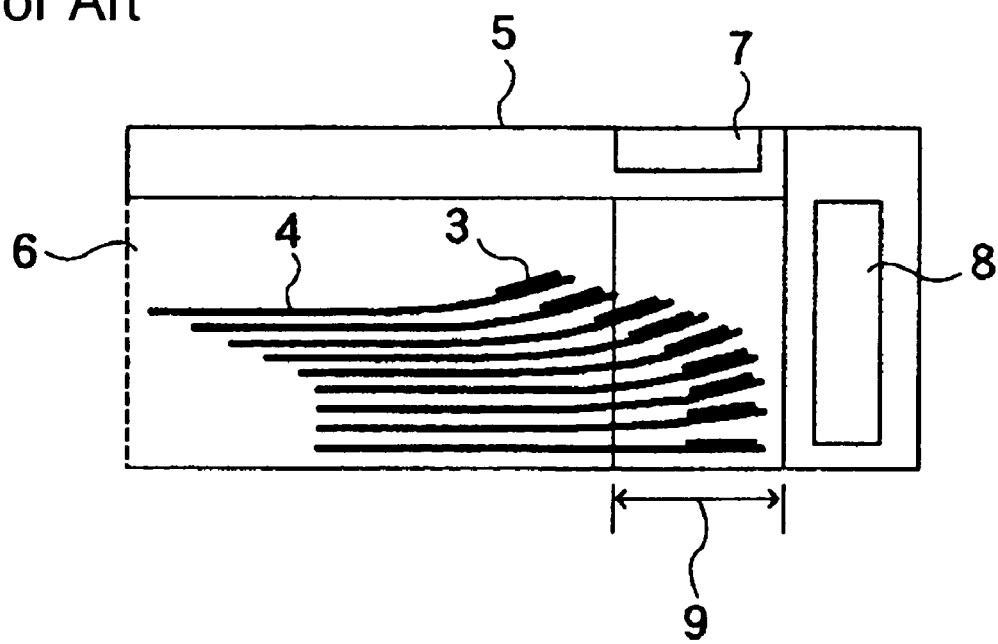
FIG. 2 is an explanatory side view showing a condition of the conventional wireless tag reader and writer.
Figure 3:
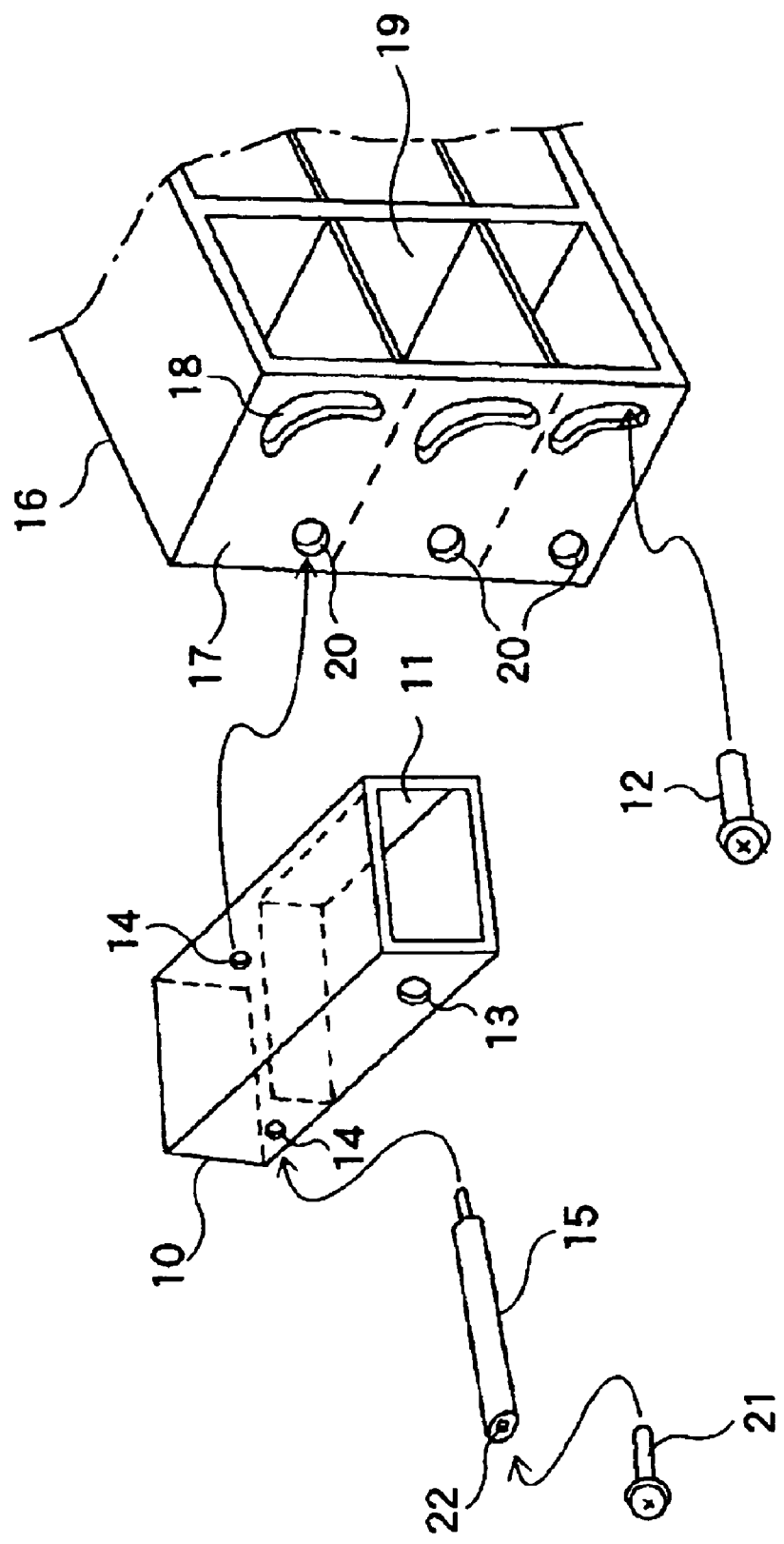
FIG. 3 is a perspective view showing the mounting relationship between a wireless tag reader and writer and a read and write box according to an embodiment of the invention.
Figure 4A:
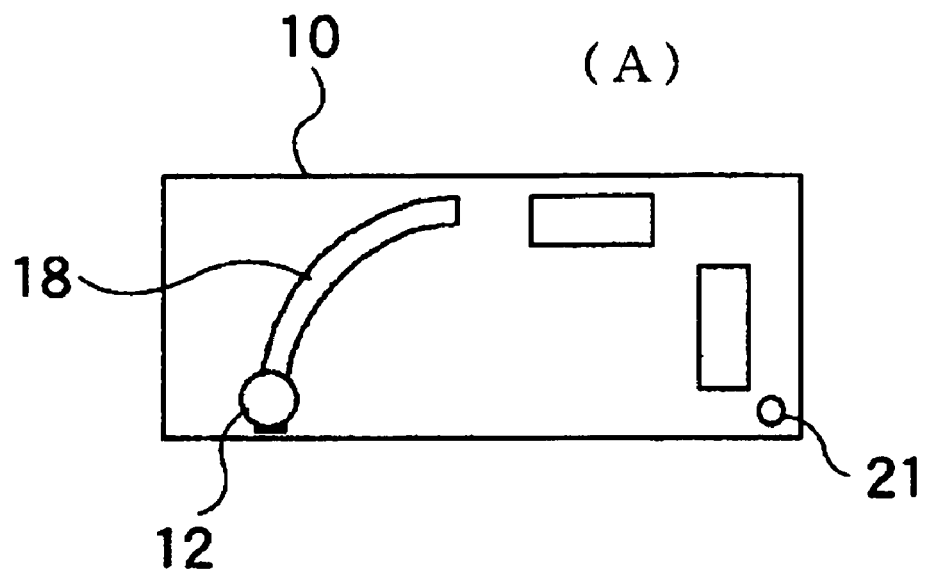
FIG. 4A is a schematic side view showing the positional relationship between the inclined slide slit and the fixing screw of the read and write box of the wireless tag reader and writer according to an embodiment of the invention, with the read and write box in a horizontal state.
Figure 4B:
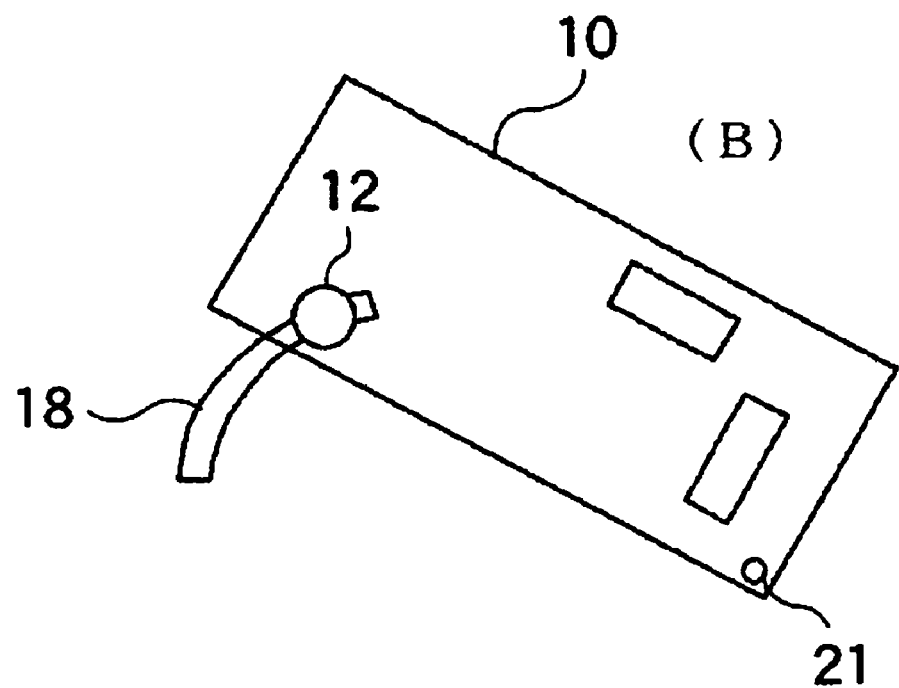
FIG. 4B is a schematic side view showing the positional relationship between the inclined slide slit and the fixing screw of the read and write box, with the read and write box in an inclined state.
Figure 5:
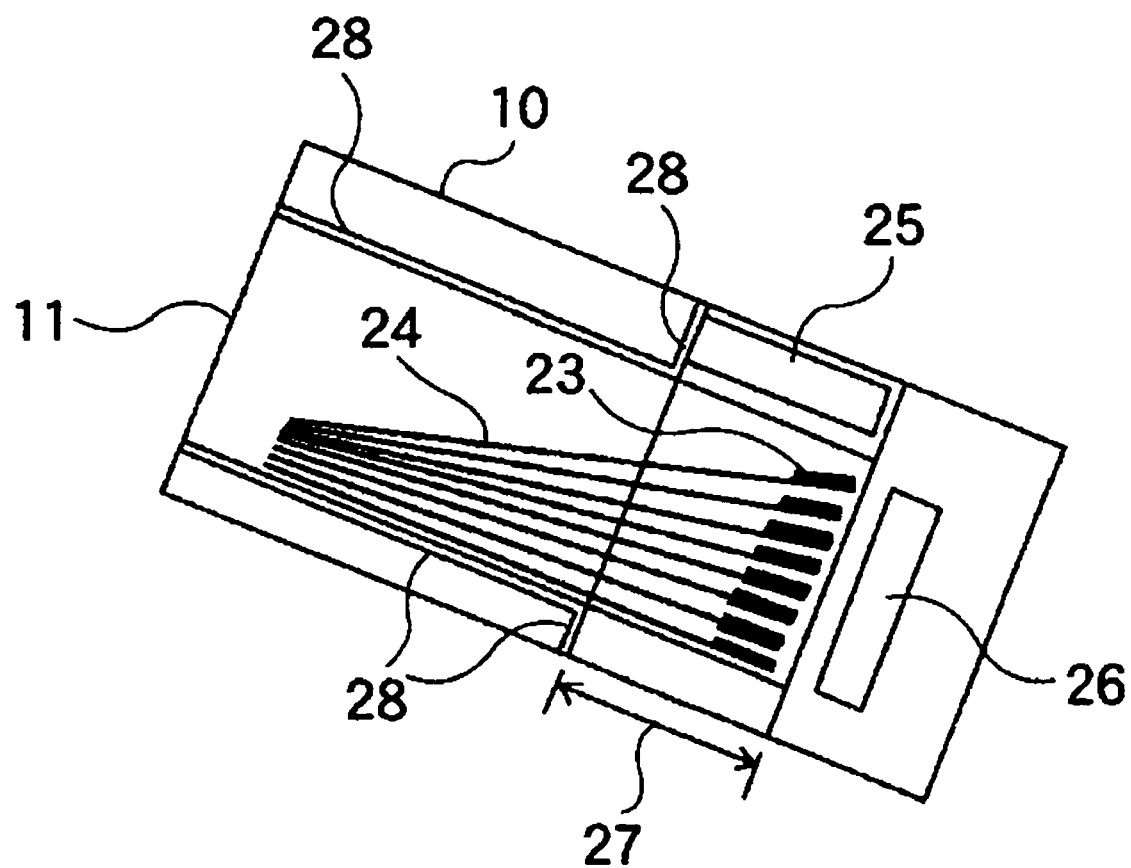
FIG. 5 is a side view describing a state in which mail with wireless tags is stored in a normal state in the inclined read and write box according to an embodiment of the invention.

FIG. 3 is a perspective view showing the mounting relationship between the wireless tag reader and writer and the read and write box according to an embodiment of the invention; and FIGS. 4A and 4B are explanatory diagrams showing the positional relationship between the inclined slide slit of the wireless tag reader and writer and the fixing screw for the read and write box, in which FIG. 4A is a schematic side view of the read and write box in a horizontal state; FIG. 4B is a schematic side view of the read and write box in an inclined state. FIG. 5 is a side view describing a state in which mail with wireless tags is stored in a normal state in the inclined read and write box of the embodiment of the invention. Components of FIGS. 4A, 4B, and 5 identical to those of FIG. 3 are given the same reference numerals, and their detailed description will be omitted, and only the difference from FIG. 3 will be principally described.

Referring to FIG. 3, there is a screw hole 13 for a fixing screw 12 fixed in the lower part of a side wall of a read and write box 10 for accommodating mail and in the vicinity of a front opening 11. There are bearing holes 14 at the opposing positions of the right and left side walls at the end opposite to the front opening 11 of the read and write box 10, through which the both ends of a long rotation shaft 15 are inserted and borne.

A wireless tag reader and writer 16 has an arc-shaped slide slit 18 in a side wall 17 of each storage compartment 19 of the read and write box 10. The fixing screw 12 to be screwed in the screw hole 13 slides along the slide slit 18. There is a second bearing hole 20 through which the rotation shaft 15 is inserted in the lower and rear part of a side wall 17 of each storage compartment 19 of the wireless tag reader and writer 16.

After the read and write box 10 is mounted in each storage compartment 19 of the wireless tag reader and writer 16, then the rotation shaft 15 is inserted through the second bearing hole 20 and the bearing hole 14 of the read and write box 10, and a shaft screw 21 is screwed into a screw hole 22 in the rotation shaft 15 such that the read and write box 10 rotates around the rotation shaft 15 in the storage compartment 19 of the wireless tag reader and writer 16.

The fixing screw 12 projecting to the exterior from the inclined slide slit 18 is screwed and fixed into the screw hole 13.

All the read and write box 10 are mounted to all the storage compartments 19 of the wireless tag reader and writer 16.

FIG. 4A shows the positional relationship between the slide slit 18 and the fixing screw 12 when the read and write box 10 is in a horizontal position. In this case, the fixing screw 12 is located at the lowermost end of the slide slit 18.

FIG. 4B shows the read and write box 10 with the maximum inclination. In this case, the fixing screw 12 is located at the uppermost end of the slide slit 18.

FIG. 5 shows a state in which multiple pieces of mail 24 with wireless tags 23 are held in the read and write box 10 so as not to slide toward the opening 11 owing to an inclination of the read and write box 10, and in which the wireless tags 23 are located in a normal write area 27 of a write antenna 26.

A read antenna 25 for reading the position of the mail 24 is disposed on the upper surface of the end of the read and write box 10. The write antenna 26 for writing management information including the delivery destination and weight of the mail 24 is disposed on the front of the end of the read and write box 10.

A radio-wave absorber 28 is bonded to the upper, lower, right, and left sides of the normal write area 27 in the read and write box 10 adjacent to the opening 11 relative to the normal write area 27, thereby preventing the reflection or leakage of radio waves toward the opening 11, and the mutual interference of radio waves with adjacent surrounding read and write boxes 10.

With such a structure, mail sorters sort the mail 24 with the wireless tags 23 shown in FIG. 5 by address, and put the mail 24 in sequence into the read and write boxes 10 through the respective openings 11.

At that time, mail sorters sort the mail 24 while observing the state of the stacked mail 24 from the thickness of the contents of the mail 24 and the wireless tags 23 and the amount of the mail 24 stacked, shown in FIG. 5, and controlling the inclination of the read and write boxes 10, e.g., with the head of the fixing screw 12 in their hands so that the wireless tags 23 come in the normal write area 27 of the write antenna 26, as shown in FIG. 5.

Since the wireless tags 23 are thus always held in the normal write area 27 of the write antenna 26 in the read and write boxes 10, the reading of positional information from the wireless tags 23 and the writing of management information to the wireless tags 23 can always be executed accurately.

What is claimed is:

1. A wireless tag reader and writer comprising:

a storage box having a plurality of storage compartments each having an opening end for storing a plurality of read and write boxes;

each read and write box having a front opening at a front end thereof, and a read antenna and a write antenna for communicating with a wireless tag on a side wall at the end opposite to the front opening, the read and write box accommodating an article with the wireless tag through the front opening;

a fixing portion provided on the side wall of the read and write box adjacent to the front opening, for fixing the read and write box with a fixing screw;

a first insertion hole in the side wall of the read and write box at the end opposite to the front opening, for allowing a shaft to pass through;

a slide slit in an outer side wall of the storage compartment adjacent to its opening end, through which the fixing screw slides; and a second insertion hole in the outer side wall of the storage compartment at the rear opposite to its opening end, for allowing the shaft to pass through;

the fixing screw screwed to the fixing portion and in the slide slit in such a manner that the read and write box rotates around the shaft in the storage compartment and is fixed in an inclined state in which the front opening of the read and write box is higher than the end opposite to the front opening.

2. The wireless tag reader and writer according to claim 1, wherein the slide slit is shaped like an arc.

3. The wireless tag reader and writer according to claim 1, wherein the read and write box has a radio-wave absorber disposed therewithin.

4. A wireless tag reader and writer comprising:

a read and write box having an opening at a front end thereof, through which an article with a wireless tag is accommodated, and a read antenna and a write antenna for communicating with a wireless tag provided on a side wall at a of the read and write box opposite to to front opening; and a storage box for storing the read and write box in such a manner that the read and write box is so inclined that the vicinity of the front opening of the read and write box is higher than the thereof.

* * * * *